(12) United States Patent
Yang et al.

(10) Patent No.: US 7,880,869 B2
(45) Date of Patent: Feb. 1, 2011

(54) CALIBRATION APPARATUS AND METHOD FOR OPTICAL SYSTEM ASSEMBLY

(75) Inventors: Tsung-Min Yang, Hsinchu (TW); Wei-Chih Lu, Hsinchu (TW)

(73) Assignee: TopRay Technologies, Inc., Hsinchu (TW)

( * ) Notice: Subject to any disclaimer, the term of this patent is extended or adjusted under 35 U.S.C. 154(b) by 126 days.

(21) Appl. No.: 12/465,632

(22) Filed: May 13, 2009

(65) Prior Publication Data
US 2010/0290036 A1    Nov. 18, 2010

(51) Int. Cl.
    *G01B 9/00* (2006.01)
(52) U.S. Cl. ..................................... 356/124; 356/127
(58) Field of Classification Search .......... 356/124–127
    See application file for complete search history.

(56) References Cited
U.S. PATENT DOCUMENTS

| | | | |
|---|---|---|---|
| 6,654,048 B1 * | 11/2003 | Barrett-Lennard et al. | 348/180 |
| 7,459,696 B2 * | 12/2008 | Schomacker et al. | 250/458.1 |
| 7,584,756 B2 * | 9/2009 | Zadoyan et al. | 128/898 |
| 2001/0008465 A1 * | 7/2001 | Shimo et al. | 359/554 |

* cited by examiner

Primary Examiner—Gregory J Toatley
Assistant Examiner—Jarreas C. Underwood

(57) ABSTRACT

A calibration apparatus and method for optical system assembly is provided, applicable to a finite conjugate optical system to determine the optimal image-forming positions of the light source and the focus object lens of the finite conjugate optical system. The apparatus includes an external light source, a low magnification image-forming optical system, an electrical control system and a monitor. When the parallel beam generated by the external light source is parallel to the optical axis of the finite conjugate optical system, the low magnification image-forming optical system is used to magnify the two focal spots formed by the external light source and the internal light source of the finite conjugate optical system to be calibrated. Finally, by adjusting the related position of the focus object lens or the internal light source of the finite conjugate optical system, the optimal relative positions between the light source and the focus object lens of the finite conjugate optical system can be found. The calibration apparatus of the present invention has the advantages of simple structure, easy assemble and setup, high precision assembly and low cost, as well as the capability to perform optimal calibration of the relative position of the focus object lens and the light source of each individual finite conjugate optical system.

15 Claims, 5 Drawing Sheets

CALIBRATION APPARATUS AND METHOD FOR OPTICAL SYSTEM ASSEMBLY

FIELD OF THE INVENTION

The present invention generally relates to a calibration apparatus and method for optical system assembly, applicable to calibrating the optimal imaging position between optical source and the focusing object lens of a finite conjugate optical system when assembling the finite conjugate optical system.

BACKGROUND OF THE INVENTION

The optical lens, such as the reader head of the CD player, digital camera, mobile phone camera and optical communication device, is in wide demands. As the high precision molding industry, such as glass molding and injection molding, rapidly progresses, the axis-symmetrical optical components must overlap the optical axis and the rotational symmetrical axis during the manufacturing or system assembly to avoid off-axis aberration errors. As the optical lens is widely applied and the demands on the calibration of optical system assembly, the error checking and estimation is an important issue for manufacturing high precision optical lens.

In the general optical system, if the optical axis of the lens does not coincide with the reference axis, there will be off-axis aberrations in the optical image formed by the optical beam entering the optical system through reflection and refraction; thus, the overall quality of the optical system is compromised. Therefore, currently, the optical components, such as lens, will be calibrated before assembling the optical system.

The approach to confirm the image-forming quality of the conventional optical system is to use high magnification optical system to magnify the focal spot of the object lens of the reader head. With the shape of the spot, the image-forming quality can be analyzed and then the component quality and the aberrations of the optical system can be further analyzed. However, the above optical calibration system is easily affected by the environment and the vibration during calibration because of using the high magnification optical system. In actual application, the vibration problem must be solved with the assistance of a servo control system. Therefore, the system is complicated and more costly.

SUMMARY OF THE INVENTION

The primary object of the present invention is to provide a calibration apparatus and method for optical system assembly. Through the calibration apparatus of the present invention provides, during the assembly of finite conjugate optical system, the optimal image-forming location between the light source and the focus object lens of the finite conjugate optical system can be determined and used as a basis to assemble the optical system so as to achieve the optimal image height of the finite conjugate optical system.

The calibration apparatus of the present invention has the advantages of simple structure, easy assemble and setup, high precision assembly and low cost, as well as the capability to perform optimal calibration of the relative position of the focus object lens and the light source of each individual finite conjugate optical system. Because the focus object lens of the finite conjugate optical system may vary slightly because of the manufacturing process, with the calibration apparatus of the present invention, not only the optimal relative position between the focus object lens and the internal light source can be calibrated, but also the manufacturing error of the focus object lens.

The calibration apparatus for optical system assembly of the present invention includes an external light source, a low magnification image-forming optical system, an electrical control system and a monitor.

According to the present invention, the parallel beam generated by the external light source enters the finite conjugate optical system to be calibrated and forms a first focal spot through focus object lens. The electrical control system activates the internal light source of finite conjugate optical system to be calibrated and lets the beam from the internal light source form a second focal spot through the focus object lens. Then, the first focal spot and the second focal spot are magnified by the low magnification image-forming optical system and monitored through the monitor. Finally, the electrical control system adjusts the related position of the focus object lens or the internal light source of the finite conjugate optical system to find the optimal relative positions between the light source and the focus object lens of the finite conjugate optical system.

The calibration method for optical system assembly of the present invention includes the steps of: adjusting the beam from the external light source to be parallel with the optical axis of the finite conjugate optical system; letting the low magnification image-forming optical system display simultaneously the two focal spots formed by the finite conjugate optical system to be calibrated and the external light source respectively, and monitoring through the monitor; and finally, adjusting the position of the focus object lens or the internal light source position of the finite conjugate optical system to find the optimal image height of the finite conjugate optical system.

The foregoing and other objects, features, aspects and advantages of the present invention will become better understood from a careful reading of a detailed description provided herein below with appropriate reference to the accompanying drawings.

BRIEF DESCRIPTION OF THE DRAWINGS

The present invention can be understood in more detail by reading the subsequent detailed description in conjunction with the examples and references made to the accompanying drawings, wherein.

DETAILED DESCRIPTION OF THE PREFERRED EMBODIMENTS

Figure 1:
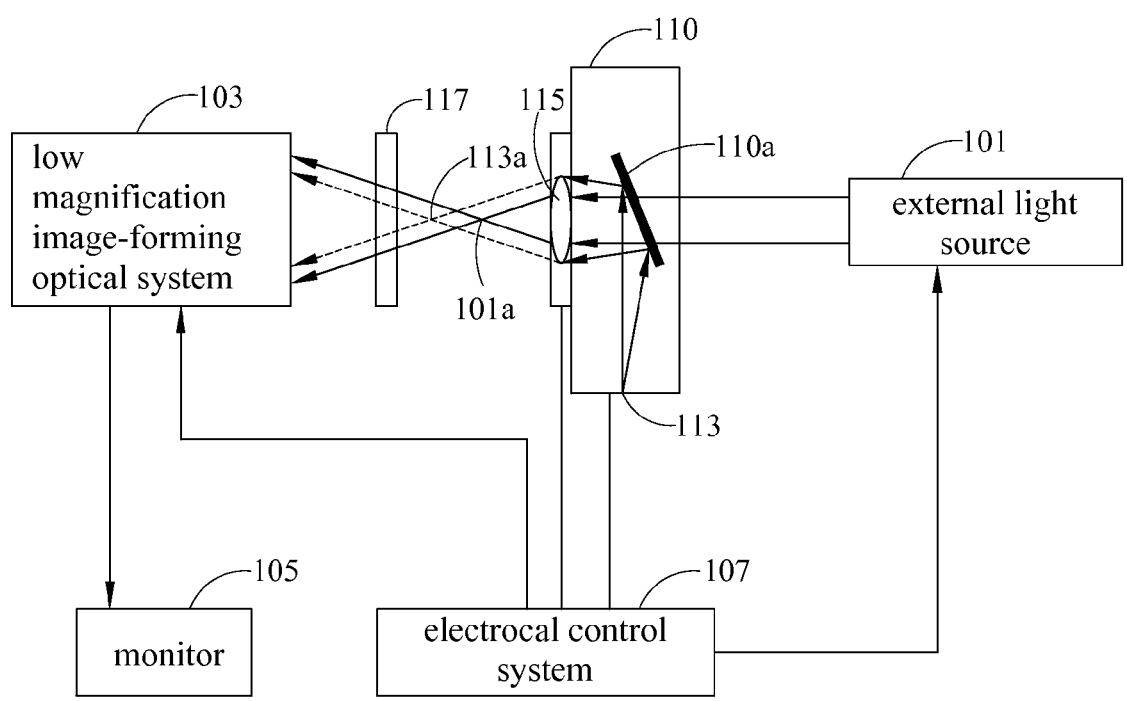
FIG. 1 shows a schematic view of a calibration apparatus for optical system assembly according to the invention.

FIG. 1 shows a schematic view of a calibration apparatus for optical system assembly according to the present invention. The calibration apparatus is applied to a finite conjugate optical system 110 to find the optimal image-forming position between internal light source 113 and focus object lens 115. As shown in FIG. 1, the calibration apparatus for optical system assembly includes at least an external light source 101, a low magnification image-forming optical system 103 an electrical control system 107 and a monitor 105.

The parallel beam generated by external light source 101 of the calibration apparatus enters finite conjugate optical system 110 and forms a first focal spot 101a through focus object lens 115; electrical control system 107 activating internal light source 113 of finite conjugate optical system 110 and letting the beam from internal light source 113 form a second focal spot 113a through focus object lens 115; then, first focal spot 101a and second focal spot 113a being magnified by low magnification image-forming optical system 103 and monitored through the monitor 105; and finally, electrical control system 107 adjusting the related position of focus object lens 115 or internal light source 113 of finite conjugate optical system 110 to find the optimal relative positions between internal light source 113 and focus object lens 115 of the finite conjugate optical system 110.

The calibration apparatus may further include a compensated plate 117 between finite conjugate optical system 110 and low magnification image-forming optical system 103 as the compensated plate for focus object lens 115. Electrical control system 107, in addition to controlling internal light source 113 of finite conjugate optical control system 110, can also control the fine tuning and movement of focus object lens 115 of the finite conjugate optical system 110 and control the activation of external light source 101, as well as provide power to low magnification image-forming optical system 103. Finite conjugate optical system 110 further includes a splitter 110a for reflecting the beam from internal light source 113 to incident beam having other incident angle. Low magnification optical system 103 includes a charge coupled device (CCD). The image of first focal spot 101a and second focal spot 113a can be formed on the CCD.

It is worth noting that the characteristic of the focus object lens is to have the optimal image-forming quality at the object image position designed by the object lens. However, how to assure that the internal light source of the optical system is positioned at the optical axis of the focus object lens will require a reference index during assembling the optical system. The calibration apparatus of the present invention is to use the parallel beam generated by external light source 101 traveling in parallel with the optical axis of the optical system. The parallel beam forms first spot 101a through the focus object lens. Low magnification image-forming optical system 103 forms the image of first focal spot 101a on the monitor, and then the position of first focal spot 101a generated by external light source 101 can be used as the standard reference position of the optical axis of the optical system.

When the position of first focal spot 101a is the reference position of the optical axis of the optical system and the internal light source of the optical system is turned on, the beam from the internal light source will form a second focal spot through the focus object lens. By fine tuning the related components, such as the position of focus object lens or the internal light source, of the optical system to let the second focal spot and the first focal spot as the reference to be positioned at the optimal relative positions, the optimal image-forming quality of the optical system is obtained.

Figure 2:
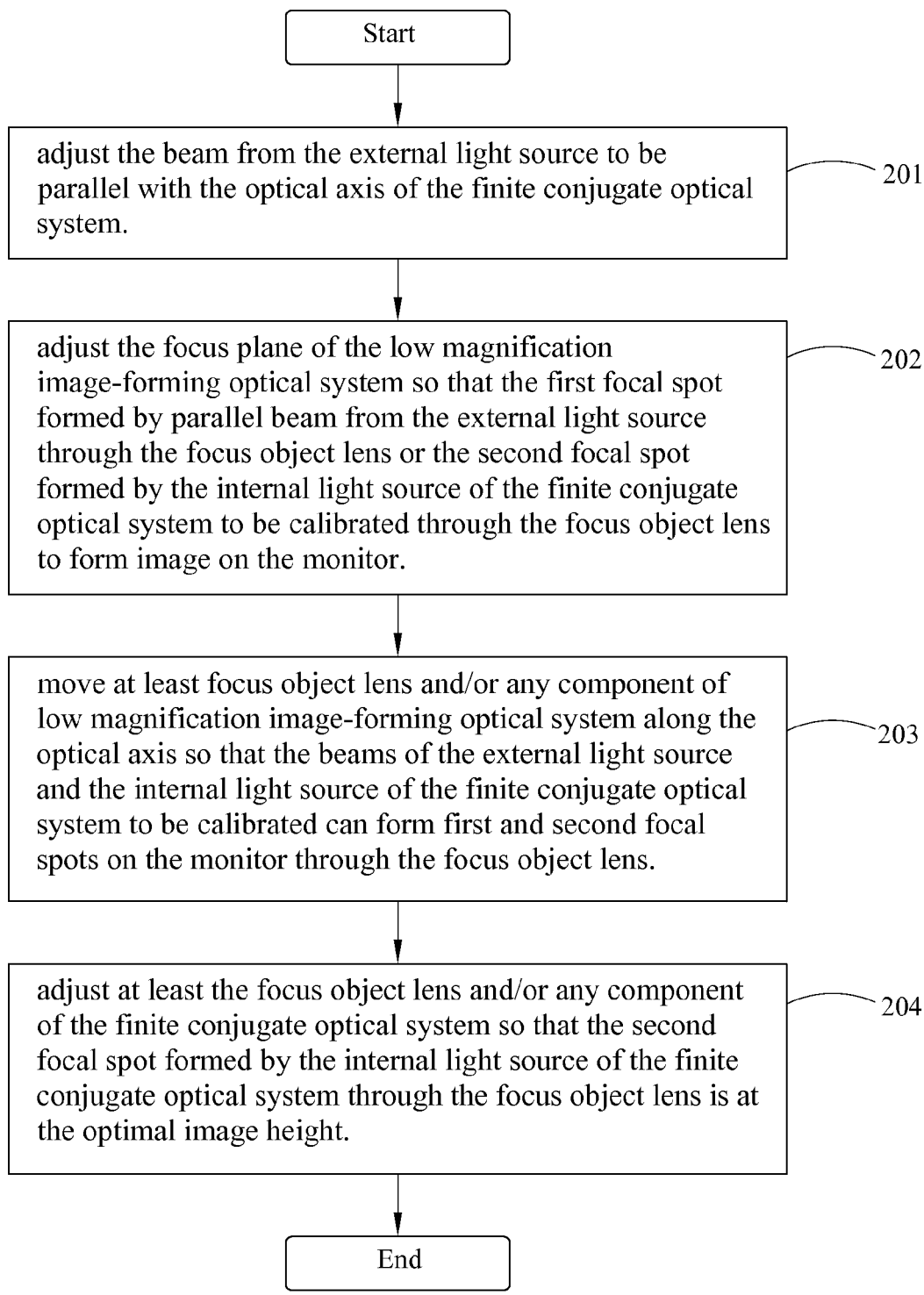
FIG. 2 shows a flowchart of a calibration method for optical system assembly according to the present invention.

In summary of the above, FIG. 2 shows a flowchart of the calibration method for optical system assembly according to the present invention. As shown in FIG. 2, step 201 is to adjust the beam from the external light source to be parallel with the optical axis of the finite conjugate optical system. Step 202 is to adjust the focus plane of the low magnification image-forming optical system so that the first focal spot formed by parallel beam from the external light source through the focus object lens or the second focal spot formed by the internal light source of the finite conjugate optical system to be calibrated through the focus object lens to form image on the monitor. Step 203 is to move at least focus object lens and/or any component of low magnification image-forming optical system along the optical axis so that the beams of the external light source and the internal light source of the finite conjugate optical system to be calibrated can form first and second focal spots on the monitor through the focus object lens. In step 203, the adjustment can be done either to move the focus object lens or low magnification image-forming optical system alone, or move both.

Finally, step 204 is to adjust at least the focus object lens and/or any component of the finite conjugate optical system so that the second focal spot formed by the internal light source of the finite conjugate optical system through the focus object lens is at the optimal image height. Similarly, in step 204, the adjustment can be done either to move the focus object lens or any component of the finite conjugate optical system alone, or move both.

The following three operational examples of the present invention describe the fine tuning of the components of the calibration apparatus so that the monitor display the two focal spots formed by the external and internal light source to facilitate the adjustment of any component of the finite conjugate optical system to be calibrated so as to achieve the calibration for the optimal image-forming position.

Figure 3:
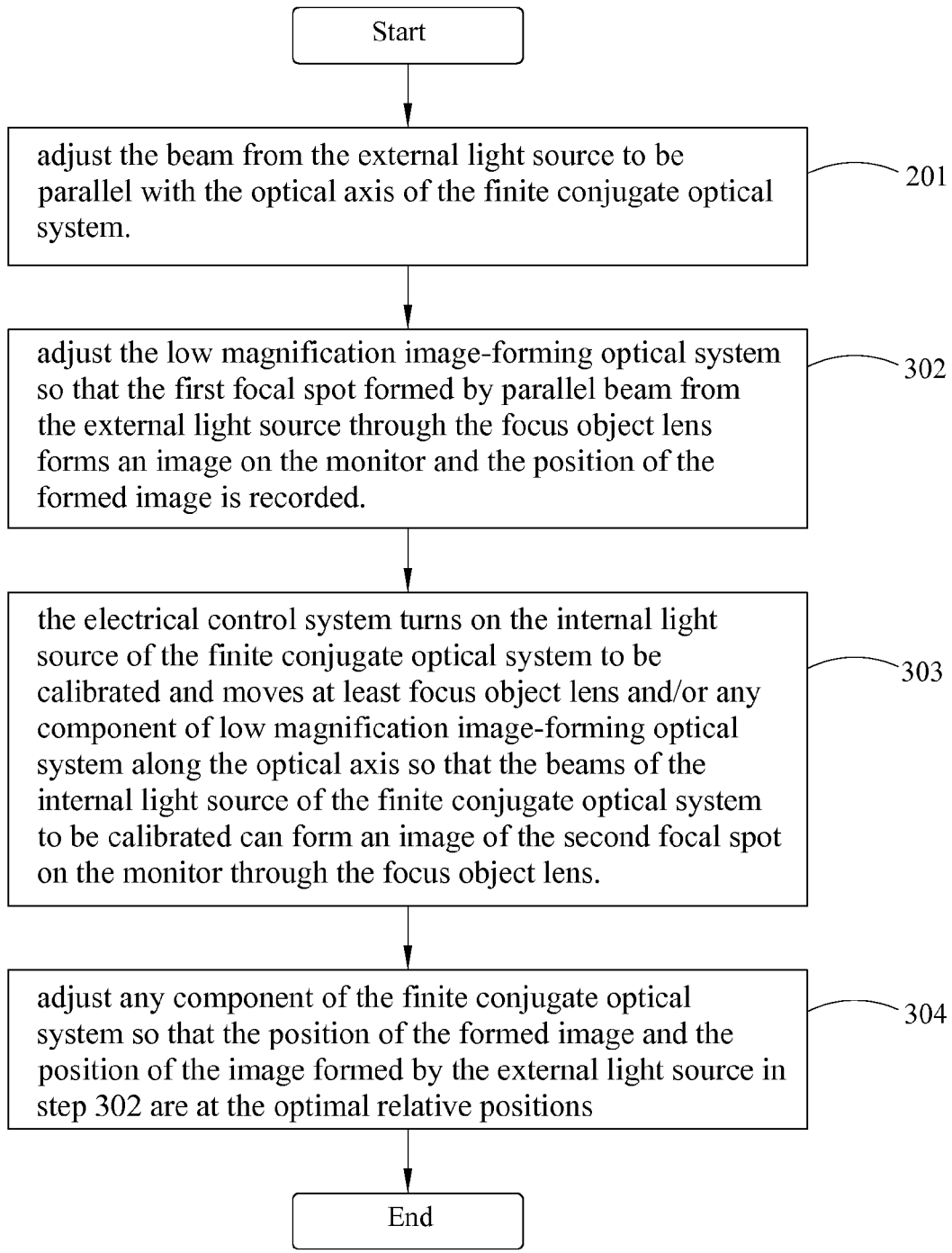
FIG. 3 shows a flowchart of a first operational example of the calibration method of the present invention.

Without the loss of generality, FIG. 3 shows a flowchart of the first operational example. In the first operational example, the position of the first focal spot formed by the parallel beam from the external light source through the focus object lens is used as a reference position to adjust any component of the finite conjugate optical system to be calibrated so as to achieve the calibration for the optimal image-forming position. As shown in FIG. 3, step 201 is to adjust the beam from the external light source to be parallel with the optical axis of the finite conjugate optical system. Step 302 is to adjust the low magnification image-forming optical system so that the first focal spot formed by parallel beam from the external light source through the focus object lens forms an image on the monitor and the position of the formed image is recorded. In step 303, the electrical control system turns on the internal light source of the finite conjugate optical system to be calibrated and moves at least focus object lens and/or any component of low magnification image-forming optical system along the optical axis so that the beams of the internal light source of the finite conjugate optical system to be calibrated can form an image of the second focal spot on the monitor through the focus object lens. Finally, step 304 is to adjust any component of the finite conjugate optical system so that the position of the formed image and the position of the image formed by the external light source in step 302 are at the optimal relative positions.

Figure 4:
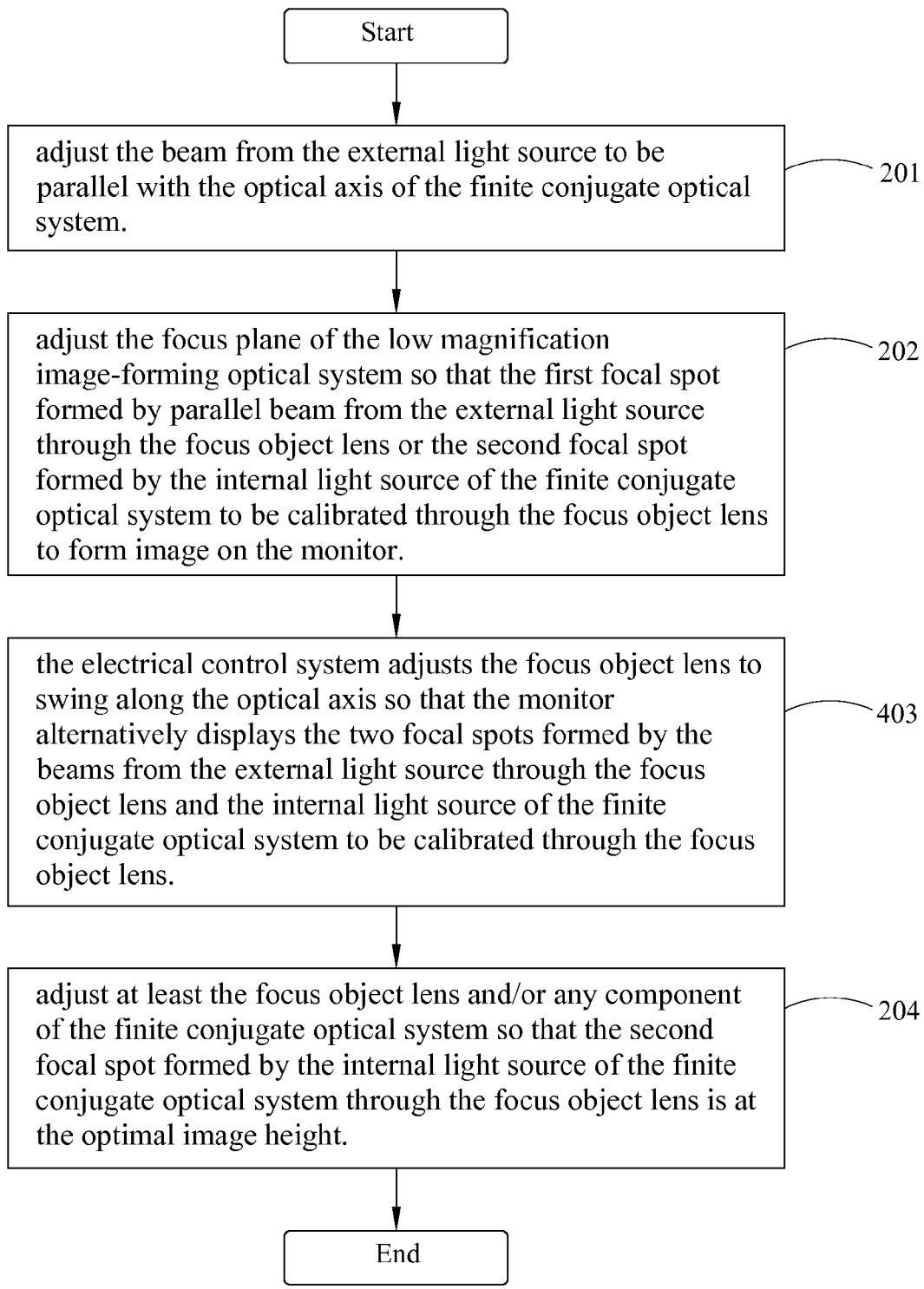
FIG. 4 shows a flowchart of a second operational example of the calibration method of the present invention.

FIG. 4 shows a flowchart of the second operational example. In the second operational example, a focus object lens swinging along the optical axis is used to let the monitor alternatively display the two focal spots formed by the parallel beam from the external light source through the focus object lens and the second focal spot formed by the internal light source of the finite conjugate optical system to be calibrated so that it is convenient to adjust any component of the finite conjugate optical system to be calibrated so as to achieve the calibration for the optimal image-forming position. As shown in FIG. 4, step 201 is to adjust the beam from the external light source to be parallel with the optical axis of the finite conjugate optical system. Step 202 is to adjust the focus plane of the low magnification image-forming optical system so that the first focal spot formed by parallel beam from the external light source through the focus object lens or the second focal spot formed by the internal light source of the finite conjugate optical system to be calibrated through the focus object lens to form image on the monitor. In step 403, the electrical control system adjusts the focus object lens to swing along the optical axis so that the monitor alternatively displays the two focal spots formed by the beams from the external light source through the focus object lens and the internal light source of the finite conjugate optical system to be calibrated through the focus object lens. Step 204 is to adjust at least the focus object lens and/or any component of the finite conjugate optical system so that the second focal spot formed by the internal light source of the finite conjugate optical system through the focus object lens is at the optimal image height.

Figure 5:
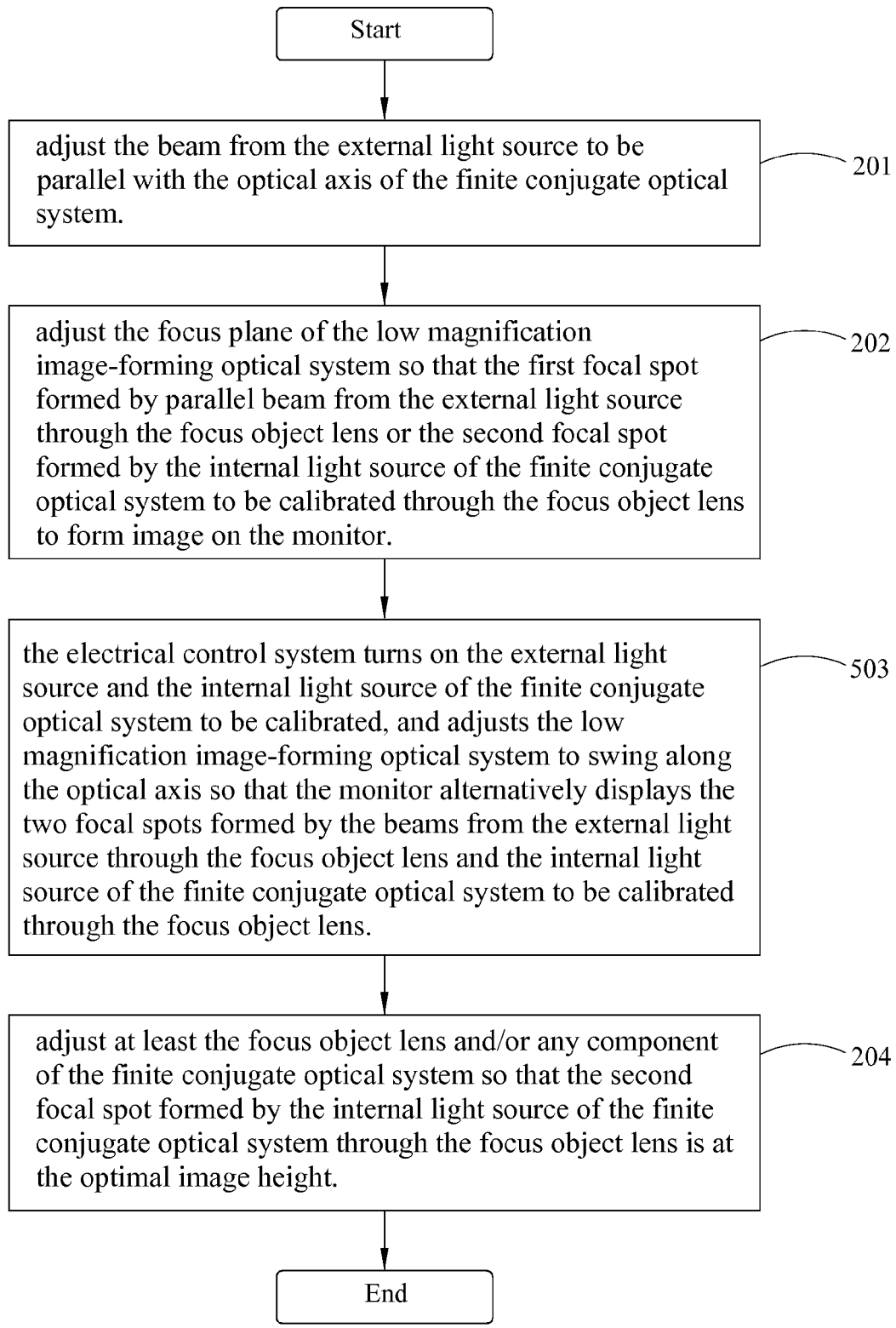
FIG. 5 shows a flowchart of a third operational example of the calibration method of the present invention.

FIG. 5 shows a flowchart of the third operational example. In the third operational example, a low magnification image-forming optical system swinging along the optical axis is used to let the monitor alternatively display the two focal spots formed by the parallel beam from the external light source through the focus object lens and the second focal spot formed by the internal light source of the finite conjugate optical system to be calibrated so that it is convenient to adjust any component of the finite conjugate optical system to be calibrated so as to achieve the calibration for the optimal image-forming position. As shown in FIG. 4, step 201 is to adjust the beam from the external light source to be parallel with the optical axis of the finite conjugate optical system. Step 202 is to adjust the focus plane of the low magnification image-forming optical system so that the first focal spot formed by parallel beam from the external light source through the focus object lens or the second focal spot formed by the internal light source of the finite conjugate optical system to be calibrated through the focus object lens to form image on the monitor. In step 503, the electrical control system turns on the external light source and the internal light source of the finite conjugate optical system to be calibrated, and adjusts the low magnification image-forming optical system to swing along the optical axis so that the monitor alternatively displays the two focal spots formed by the beams from the external light source through the focus object lens and the internal light source of the finite conjugate optical system to be calibrated through the focus object lens. Step 204 is to adjust at least the focus object lens and/or any component of the finite conjugate optical system so that the second focal spot formed by the internal light source of the finite conjugate optical system through the focus object lens is at the optimal image height.

It is worth noting that because the vertical magnification M between the object and the image of the focus object lens system is less than −1, the relative displacement is usually larger than the second focal spot formed by the focus object lens when adjusting the internal light source of the optical system. Therefore, a lower precision calibration equipment can be used on the side of the internal light source to obtain the high calibration precision in image-forming. Because the focal spot of the external light source and the displacement of the focus object lens are the same, but the displacement of the second focal spot formed by the internal light source is different from the displacement of the focus object lens when the focus object lens moves, the movement of focus object lens can achieve the optimal positions for the first focal spot and the second focal spot. In a finite conjugate optical system having at least a focus object lens, the focus object lens can be calibrated by the calibration apparatus and method of the present invention to determine the optimal image-forming position of the finite conjugate optical system.

Although the present invention has been described with reference to the preferred embodiments, it will be understood that the invention is not limited to the details described thereof. Various substitutions and modifications have been suggested in the foregoing description, and others will occur to those of ordinary skill in the art. Therefore, all such substitutions and modifications are intended to be embraced within the scope of the invention as defined in the appended claims.

What is claimed is:

1. A calibration apparatus for optical system assembly, applicable to a finite conjugate optical system for calibrating positions of an internal light source and a focus object lens of said finite conjugate optical system to obtain optimal image-forming position, said apparatus comprising:

an external light source;
a low magnification image-forming optical system;
an electrical control system; and
a monitor;
wherein beam from said external light source entering said finite conjugate optical system and passing through said focus lens to form a first focal spot; said electrical control system activating said internal light source of said finite conjugate optical system to generate beam to pass through said focus object lens to form a second focal spot; said low magnification image-forming optical system enlarging said first focal spot and said second focal spot and monitoring through said monitor; and adjusting position of said focus object lens or any component of said internal light source of said finite conjugate optical system to obtain the optimal image-forming quality.

2. The apparatus as claimed in claim 1, wherein said beam from said external light source is a parallel beam.

3. The apparatus as claimed in claim 1, wherein a glass plate between said low magnification image-forming optical system and said finite conjugate optical system, and said glass plate is a compensated plate designed to match said focus object lens.

4. The apparatus as claimed in claim 1, wherein said electrical control system can control the fine tuning of the movement of said focus object lens, activate said external light source and provide power to said low magnification image-forming optical system.

5. A calibration method for optical system assembly, applicable to a finite conjugate optical system for calibrating positions of an internal light source and a focus object lens of said finite conjugate optical system to obtain optimal image-forming position, said apparatus comprising the steps of:

(a) adjusting beam from an external light source to be parallel with the optical axis of said finite conjugate optical system;

(b) adjusting the focus plane of a low magnification image-forming optical system so that a first focal spot formed by said parallel beam from said external light source through said focus object lens or a second focal spot formed by said internal light source of said finite conjugate optical system to be calibrated through said focus object lens to form image on a monitor;

(c) moving at least said focus object lens and/or any component of said low magnification image-forming optical system along said optical axis so that said beams of said external light source and said internal light source of said finite conjugate optical system to be calibrated able to form images of said first and second focal spots on said monitor through said focus object lens; and (d) adjusting at least said focus object lens and/or any component of said finite conjugate optical system so that said second focal spot formed by said internal light source of said finite conjugate optical system through said focus object lens to be at the optimal image height.

6. The method as claimed in claim 5, wherein said beam from said external light source in said step (a) is a parallel beam.

7. The method as claimed in claim 5, wherein said step (c) is to move said focus object lens along said optical axis so that said beams of said external light source and said internal light source of said finite conjugate optical system to be calibrated able to form images of said first and second focal spots on said monitor through said focus object lens.

8. The method as claimed in claim 5, wherein said step (c) is to move said low magnification image-forming optical system along said optical axis so that said beams of said external light source and said internal light source of said finite conjugate optical system to be calibrated able to form images of said first and second focal spots on said monitor through said focus object lens.

9. The method as claimed in claim 5, wherein said step (c) is to move both said focus object lens and said low magnification image-forming optical system along said optical axis so that said beams of said external light source and said internal light source of said finite conjugate optical system to be calibrated able to form images of said first and second focal spots on said monitor through said focus object lens.

10. The method as claimed in claim 5, wherein said step (d) is to adjust at least said focus object lens so that said second focal spot formed by said internal light source of said finite conjugate optical system through said focus object lens to be at the optimal image height.

11. The method as claimed in claim 5, wherein said step (d) is to adjust any component of said finite conjugate optical system so that said second focal spot formed by said internal light source of said finite conjugate optical system through said focus object lens to be at the optimal image height.

12. The method as claimed in claim 5, wherein said step (d) is to adjusting both said focus object lens and any component of said finite conjugate optical system so that said second focal spot formed by said internal light source of said finite conjugate optical system through said focus object lens to be at the optimal image height.

13. A calibration method for optical system assembly, applicable to a finite conjugate optical system for calibrating positions of an internal light source and a focus object lens of said finite conjugate optical system to obtain optimal image-forming position, said apparatus comprising the steps of:
adjusting beam from an external light source to be parallel with the optical axis of said finite conjugate optical system;
adjusting a low magnification image-forming optical system so that a first focal spot formed by said beam from said external light source through said focus object lens forming an image on a monitor and the position of said formed image being recorded;
using an electrical control system to turn on said internal light source of said finite conjugate optical system to be calibrated and move at least said focus object lens and/or any component of said low magnification image-forming optical system along said optical axis so that said beams of said internal light source of said finite conjugate optical system to be calibrated able to form an image of a second focal spot on said monitor through said focus object lens; and
adjusting any component of said finite conjugate optical system so that the position of the formed image and the position of said image formed by said external light source in previous step to be at the optimal relative positions.

14. A calibration method for optical system assembly, applicable to a finite conjugate optical system for calibrating positions of an internal light source and a focus object lens of said finite conjugate optical system to obtain optimal image-forming position, said apparatus comprising the steps of:
adjusting beam from an external light source to be parallel with the optical axis of said finite conjugate optical system;
adjusting the focus plane of a low magnification image-forming optical system so that a first focal spot formed by said parallel beam from said external light source through said focus object lens or a second focal spot formed by said internal light source of said finite conjugate optical system to be calibrated through said focus object lens to form image on a monitor;
using an electrical control system to adjust said focus object lens to swing along said optical axis so that said monitor alternatively displaying the two focal spots formed by said beams from said external light source through said focus object lens and said second focal spot formed by said internal light source of said finite conjugate optical system to be calibrated through said focus object lens; and
adjusting at least said focus object lens and/or any component of said finite conjugate optical system so that said second focal spot formed by said internal light source of said finite conjugate optical system through said focus object lens to be at the optimal image height.

15. A calibration method for optical system assembly, applicable to a finite conjugate optical system for calibrating positions of an internal light source and a focus object lens of said finite conjugate optical system to obtain optimal image-forming position, said apparatus comprising the steps of:
adjusting beam from an external light source to be parallel with the optical axis of said finite conjugate optical system;
adjusting the focus plane of a low magnification image-forming optical system so that a first focal spot formed by said parallel beam from said external light source through said focus object lens or a second focal spot formed by said internal light source of said finite conjugate optical system to be calibrated through said focus object lens to form image on a monitor;
using an electrical control system to turn on said external light source and said internal light source of said finite conjugate optical system to be calibrated, and to adjust said low magnification image-forming optical system to swing along said optical axis so that said monitor alternatively displaying the two focal spots formed by said beams from said external light source through said focus object lens and said internal light source of said finite conjugate optical system to be calibrated through said focus object lens; and
adjusting at least said focus object lens and/or any component of said finite conjugate optical system so that said second focal spot formed by said internal light source of said finite conjugate optical system through said focus object lens to be at the optimal image height.

* * * * *